(12) United States Patent
Jacob et al.

(10) Patent No.: US 10,901,887 B2
(45) Date of Patent: Jan. 26, 2021

(54) BUFFERED FREEPOINTER MANAGEMENT MEMORY SYSTEM

(71) Applicant: International Business Machines Corporation, Armonk, NY (US)

(72) Inventors: Philip Jacob, Congers, NY (US); Philip Strenski, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 15/982,792

(22) Filed: May 17, 2018

(65) Prior Publication Data
US 2019/0354472 A1 Nov. 21, 2019

(51) Int. Cl.
G06F 12/02 (2006.01)
G06F 12/0862 (2016.01)
G06F 13/16 (2006.01)

(52) U.S. Cl.
CPC ...... *G06F 12/0246* (2013.01); *G06F 12/0862* (2013.01); *G06F 13/1673* (2013.01)

(58) Field of Classification Search
CPC ............ G06F 12/0246; G06F 12/0862; G06F 13/1673
See application file for complete search history.

(56) References Cited

U.S. PATENT DOCUMENTS

| 6,088,745 A | 7/2000 | Bertagna et al. | |
|---|---|---|---|
| 6,631,462 B1 * | 10/2003 | Wolrich | G06F 9/3004 711/132 |
| 6,918,005 B1 | 7/2005 | Marchant et al. | |
| 6,940,814 B1 * | 9/2005 | Hoffman | H04L 47/10 370/235 |
| 7,035,273 B1 * | 4/2006 | Pannell | H04L 47/24 370/412 |
| 7,159,051 B2 | 1/2007 | Chandra et al. | |

(Continued)

OTHER PUBLICATIONS

Webopedia, "All About Dual-Core Processors", Feb. 28, 2008, pp. 1-4, https://web.archive.org/web/20080228205416/http://www.webopedia.com/DidYouKnow/Hardware_Software/2005/dual_core.asp (Year: 2008).*

(Continued)

*Primary Examiner* — Christopher D Birkhimer
(74) *Attorney, Agent, or Firm* — Scully, Scott, Murphy & Presser, P.C.; Daniel Morris, Esq.

(57) ABSTRACT

A system and method of buffered freepointer management to handle burst traffic to fixed size structures in an external memory system. A circular queue stores implicitly linked free memory locations, along with an explicitly linked list in memory. The queue is updated at the head with newly released locations, and new locations from memory are added at the tail. When a freed location in the queue is reused, external memory need not be updated. When the queue is full, the system attempts to release some of the freepointers such as by dropping them if they are already linked, updating the linked list in memory only if those dropped are not already linked. Latency can be further reduced by loading new locations from memory when the queue is nearly empty, rather than waiting for empty condition, and by writing unlinked locations to memory when the queue is nearly full.

20 Claims, 6 Drawing Sheets

(56) References Cited

U.S. PATENT DOCUMENTS

| | | | | |
|---|---|---|---|---|
| 7,535,907 | B2* | 5/2009 | Hussain | H04L 49/90 370/392 |
| 7,610,468 | B2* | 10/2009 | Madisetti | G06F 12/023 711/171 |
| 7,774,374 | B1 | 8/2010 | Kizhepat et al. | |
| 8,185,672 | B2 | 5/2012 | Malleth et al. | |
| 8,856,491 | B2* | 10/2014 | Bacon | G06F 12/0261 711/216 |
| 8,891,528 | B2* | 11/2014 | Moriarty | H04L 43/0852 370/392 |
| 9,262,554 | B1 | 2/2016 | Bailey et al. | |
| 9,276,870 | B2 | 3/2016 | Testa et al. | |
| 9,384,147 | B1* | 7/2016 | Morshed | G06F 16/90339 |
| 2004/0039895 | A1* | 2/2004 | Wolrich | G06F 9/3004 712/200 |
| 2004/0131055 | A1* | 7/2004 | Calderon | G06F 12/023 370/381 |
| 2006/0227811 | A1* | 10/2006 | Hussain | H04L 49/90 370/503 |
| 2008/0104353 | A1* | 5/2008 | Madisetti | G06F 12/023 711/170 |
| 2013/0179377 | A1* | 7/2013 | Oberg | G06K 9/00986 706/45 |
| 2013/0318290 | A1* | 11/2013 | Bacon | G06F 12/0261 711/104 |
| 2013/0318315 | A1* | 11/2013 | Bacon | G06F 12/0261 711/162 |
| 2013/0343390 | A1* | 12/2013 | Moriarty | H04L 43/0852 370/392 |
| 2015/0066927 | A1* | 3/2015 | Goyal | G06F 5/14 707/737 |
| 2016/0012110 | A1* | 1/2016 | Hirzel | G06F 16/24568 707/797 |
| 2016/0294735 | A1 | 10/2016 | Panchagnula et al. | |
| 2017/0244539 | A1 | 8/2017 | Hanna et al. | |
| 2018/0173638 | A1* | 6/2018 | Zhou | G06F 12/0891 |

OTHER PUBLICATIONS

Webopedia, "multi-core technology", Feb. 28, 2008, pp. 1-3, https://web.archive.org/web/20080228000102/https://www.webopedia.com/TERM/M/multi_core_technology.html (Year: 2008).*

Webopedia, "CPU", Aug. 18, 2000, pp. 1-4, https://web.archive.org/web/20000818165653/https://www.webopedia.com/TERM/C/CPU.html (Year: 2000).*

Webopedia, "ASIC—Application-Specific Integrated Circuit", Feb. 28, 2017, p. 1, https://web.archive.org/web/20170228042439/https://www.webopedia.com/TERM/A/ASIC.html (Year: 2017).*

Webopedia, "FPGA", May 22, 2016, pp. 1-2, https://web.archive.org/web/20160522144200/http://www.webopedia.com/TERM/F/FPGA.html (Year: 2016).*

Felber et al., "Elastic Transactions", Journal of Parallel and Distributed Computing, Feb. 15, 2017, pp. 1-33.

Anonymous, "Data Structure, Method, and Computer Program for Providing a Linked List in a First Dimension and a Plurality of Linked Lists in a Second Dimension", IP.com Prior Art Database Technical Disclosure, IPCOM000171483D, Jun. 11, 2008, pp. 1-27.

Anonymous, "Method and System for Sharing a Linked-List Queue between Heterogeneous Address Spaces", IP.com Prior Art Database Technical Disclosure, IPCOM000197691D, Jul. 19, 2010, pp. 1-3.

Akritidis, "Cling: A Memory Allocator to Mitigate Dangling Pointers", Proceeding USENIX Security'10 Proceedings of the 19th USENIX conference on Security, Washington, DC, Aug. 11-13, 2010, 16 Pages.

"Free list", Wikipedia, https://en.wikipedia.org/wiki/Free_list, last download Feb. 21, 2018, 1 page.

* cited by examiner

BUFFERED FREEPOINTER MANAGEMENT MEMORY SYSTEM

STATEMENT REGARDING FEDERALLY SPONSORED RESEARCH OF DEVELOPMENT

This invention was made with U.S. Government support under Contract. No. B621073 awarded by the Department of Energy. The government has certain rights to this invention.

FIELD

The present invention generally relates to memory architectures and memory management in computer systems.

BACKGROUND

A typical memory manager or memory controller in computer memory systems are configured to include a list of pointers to free locations in memory that is maintained in the memory, e.g., a double data rate synchronous dynamic random-access (DDR) memory. The list of free memory locations are connected as a linked list where a "head" of the linked list of free memory locations is stored in the memory controller accessing the memory. When a resource such as a processor core requires a free location, the memory controller provides the first location that was pointed to by the head pointer. The location is then accessed and the next free location is identified by the linked list elements next pointer. The head freepointer is now updated to this next location. The address of location pointed previously by the head pointer is now given to the requester that requested this memory location.

If multiple requestors need a free memory location, the requests must be serialized in current implementations. While the first requestor can be given the free location immediately, the next one must wait to access the memory to identify the next free location in the linked list and this limits the performance achievable. Going to DDR memory in a conventional memory manager/memory controller implementations requires about 45-50 clock cycles which incurs much latency in the system.

Thus, prior art implementations of the DDR controller that serialize execution units' requests one at a time and fetch next available free memory location pointer one at a time, are inadequate for handling burst traffic when multiple requests from competing requestors (e.g., multiple processor cores or execution units) are received at once (or in close succession), i.e., obtaining the freepointer one at a time from dram will incur high latency.

SUMMARY

A system and method are provided that avoids this resource latency constraint faced in managing free list pointers in memory by buffering addresses of the first few locations in a linked list within a Field Programmable Gate Array controller circuit external to the memory.

A buffered free memory pointer architecture configured to manage memory, e.g., allocate and deallocate the free list locations of data structures in memory, and improve the performance of the computer when multiple requestors need these locations as a burst.

In one aspect, there is provided a free memory pointer management apparatus for an external memory system. The apparatus comprises: a circular buffer having entries for storing pointers to free memory locations in the memory system, the circular buffer maintaining a queue including a linked list of free memory pointers corresponding to available memory locations in the DRAM; a controller to receive requests from one or more processor cores of a multi-core processor, a request comprising one of: a request to receive a free memory location, or a request to release a freed memory location; and the controller removing of a stored memory pointer via a top of the queue for transmittal to a requesting processor core in response to the request to receive, or adding a memory pointer released from the processor core to the top of the queue in response to the request to release, the apparatus managing a sub-set of free memory pointers to the external memory system.

In accordance with a further aspect of the invention, there is provided a method for free memory pointer management for an external memory system. The method comprises: storing, in a circular buffer having entries, pointers to free memory locations in the memory system, the circular buffer maintaining a queue including a linked list of free memory pointers corresponding to available memory locations in the DRAM; receiving, at a controller, requests from one or more processor cores of a multi-core processor, a request comprising one of: a request to receive a free memory location, or a request to release a freed memory location; and in response to a received request; and responsive to the request to receive, the controller removing of a stored memory pointer via a top of the queue for transmittal to a requesting processor core; and responsive to the request to release, adding a memory pointer released from the processor core to the top of the queue, the controller managing a sub-set of free memory pointers to the external memory system.

In accordance with a further embodiment of the invention, there is provided a multiprocessor computing system comprising one or more processor devices and a shared external memory system comprising one or more memory storage structures having addressable locations for storing data for the one or more processor devices, a freepointer linked list of pointers pointing to the addressable memory locations, and a memory controller for controlling entries of the freepointer linked list in the external memory, wherein the system comprises: a circular buffer external to the memory system, the circular buffer having entries for storing pointers to free memory locations in the memory system, and maintaining a queue including a linked list of free memory pointers corresponding to the freepointer linked list in the memory system; a controller coupled to the circular buffer, the controller configured to receive requests from one or more processor devices, a request comprising one of: a request to receive a free memory location, or a request to release a freed memory location; and the controller removing of a stored memory pointer via a top of the queue for transmittal to a requesting processor device in response to the request to receive, or adding a memory pointer released from the processor device to the top of the queue in response to the request to release, the circular buffer and controller managing a sub-set of free memory pointers to the external memory system.

The present invention is advantageously employed in a multiprocessing computer system having a plurality of processor devices each competing for access to a shared memory structure, however, can easily be adapted for use in multi-core uniprocessor computer systems.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

The present invention provides a novel memory system and method for managing the free list locations of data structures in a memory system, e.g., a DRAM such as, but not limited to, a Dual-Data Rate (DDR) memory, a flash memory system, a phase change memory system (hereinafter "external memory" or "memory system") and improving the performance of competing requestor processors when multiple requestors need these locations as a burst.

The system and method herein solves the resource constraint faced in managing free list pointers in memory by buffering addresses of the first few locations in the linked list within a controller external to the memory system. Additional mechanisms are described in the allocation and deallocation of memory performed to manage a buffered subset of addresses.

Figure 1:
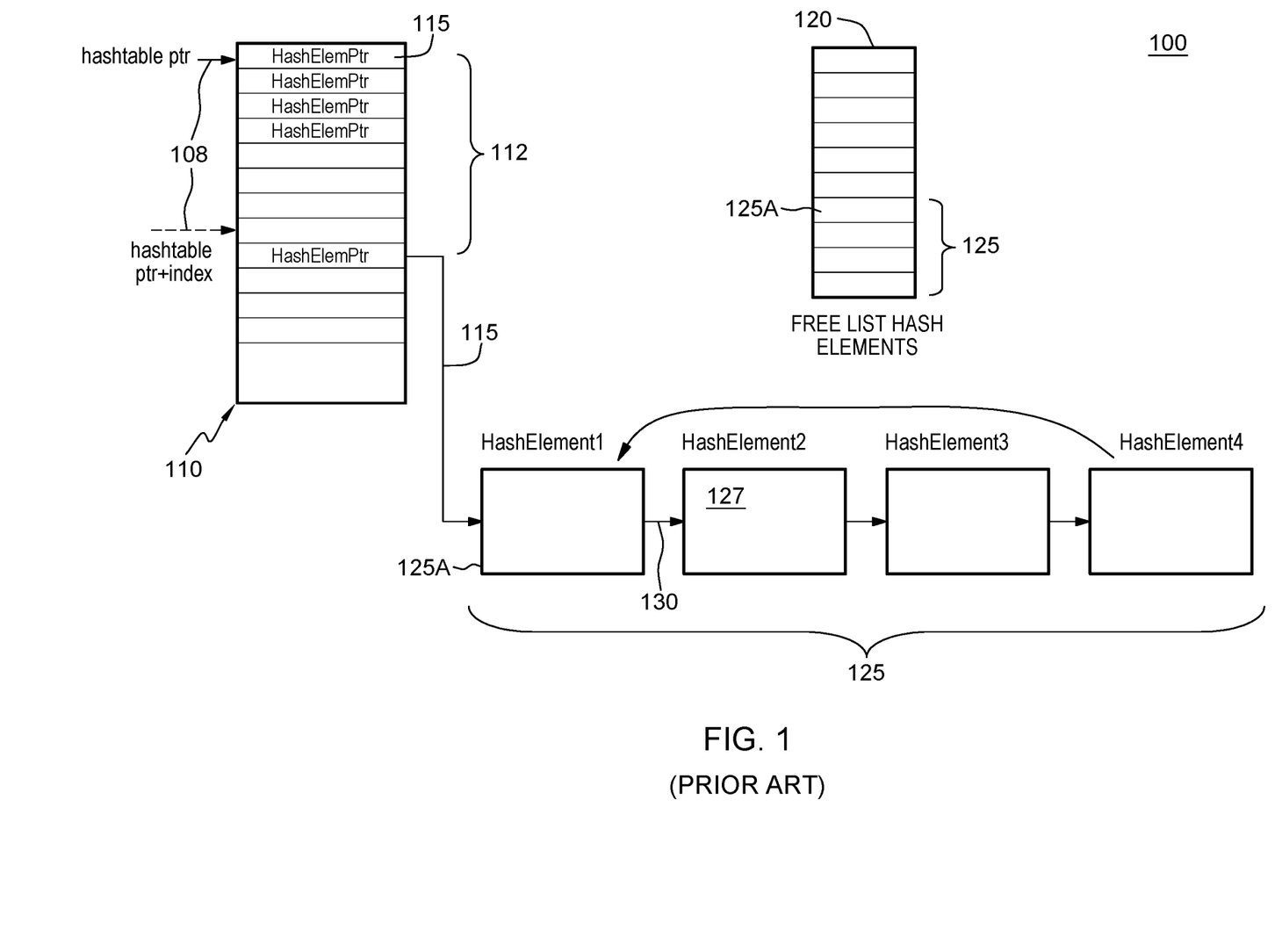
FIG. 1 shows one example embodiment of memory structures in a conventional memory system including fixed size structures that could be in the form of a hash map or linked list.

FIG. 1 shows an external memory system 100 such as a dynamic RAM (DRAM) memory or a DDR memory, containing fixed size structures in the form of a hash table map 110 and a corresponding linked list array structure 120 maintaining a linked list of free and available memory locations in the external memory. The hash table map data structure 110 implements an associative array 112 of free memory pointers (HashElemPtr) 115 that point to a head pointer of the linked list. The hash table map data structure 110 implements a hash function to compute a pointer index 108 for accessing a particular memory pointer element in the array 112 of memory pointers 115. A HashElemPtr memory pointer 115 points to a first hash memory element, i.e., a first element 125a of a linked list of free memory locations 125 which can be used for memory read or write operations in the external memory. That is, instead of each hash array element values, each item in the hash table map data structure 110 is simply the head pointer 115 to a first item 125a in a linked list 125. Then, by calculating the hash, there is provided an index 108 into the array 112—which in provides the head 115 of the linked list (i.e. the first item in each list 125).

Each linked list 125 is a normal linked list, with each node (memory structure) being a record 127 containing a key (and other values if such exists) as well as a next pointer 130 to a following item in that linked list.

Figure 2:
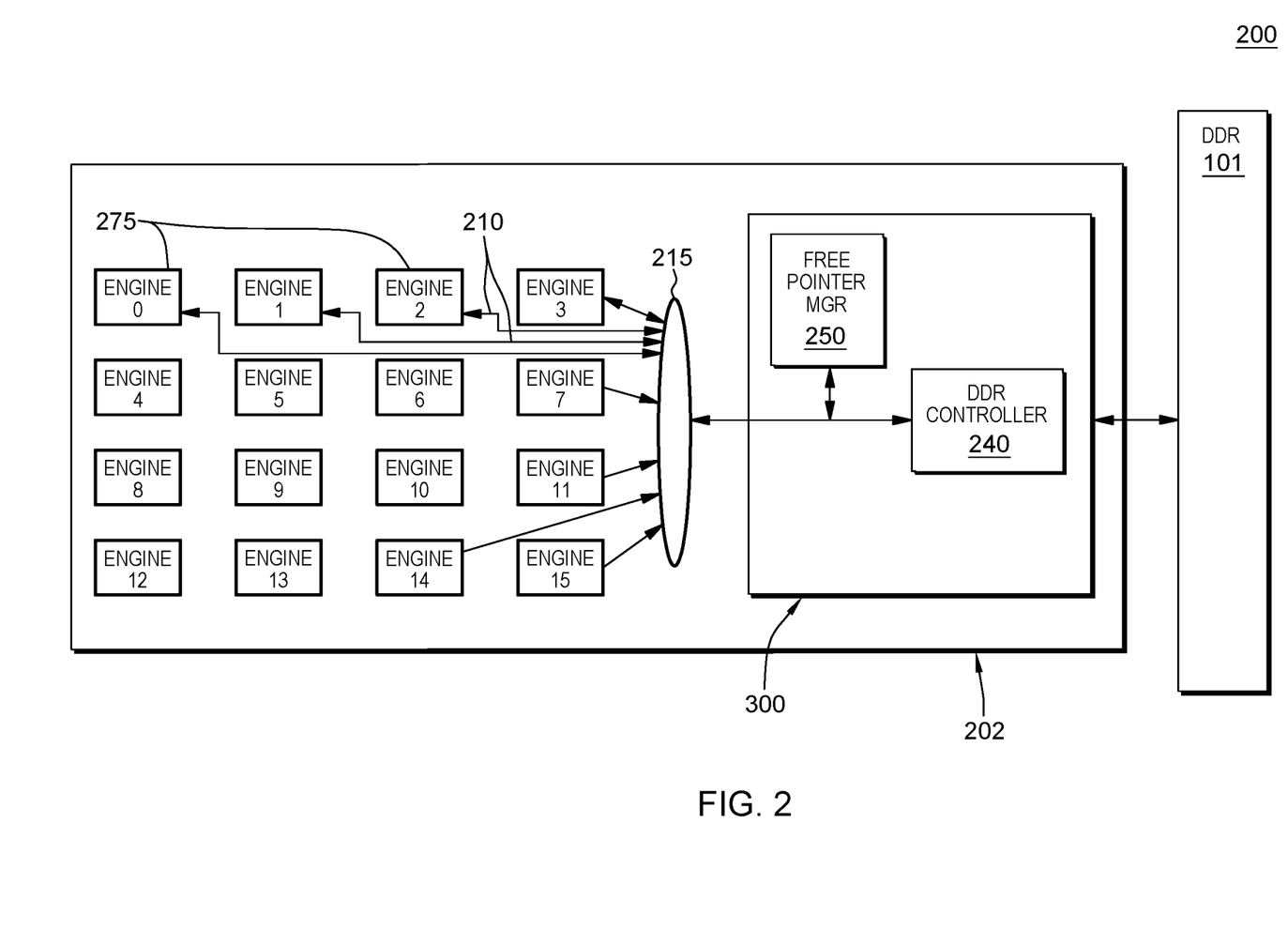
FIG. 2 is a circuit diagram depicting burst traffic from multiple requestors seeking free memory structures in an external memory according to an embodiment of the invention.
Figure 3:
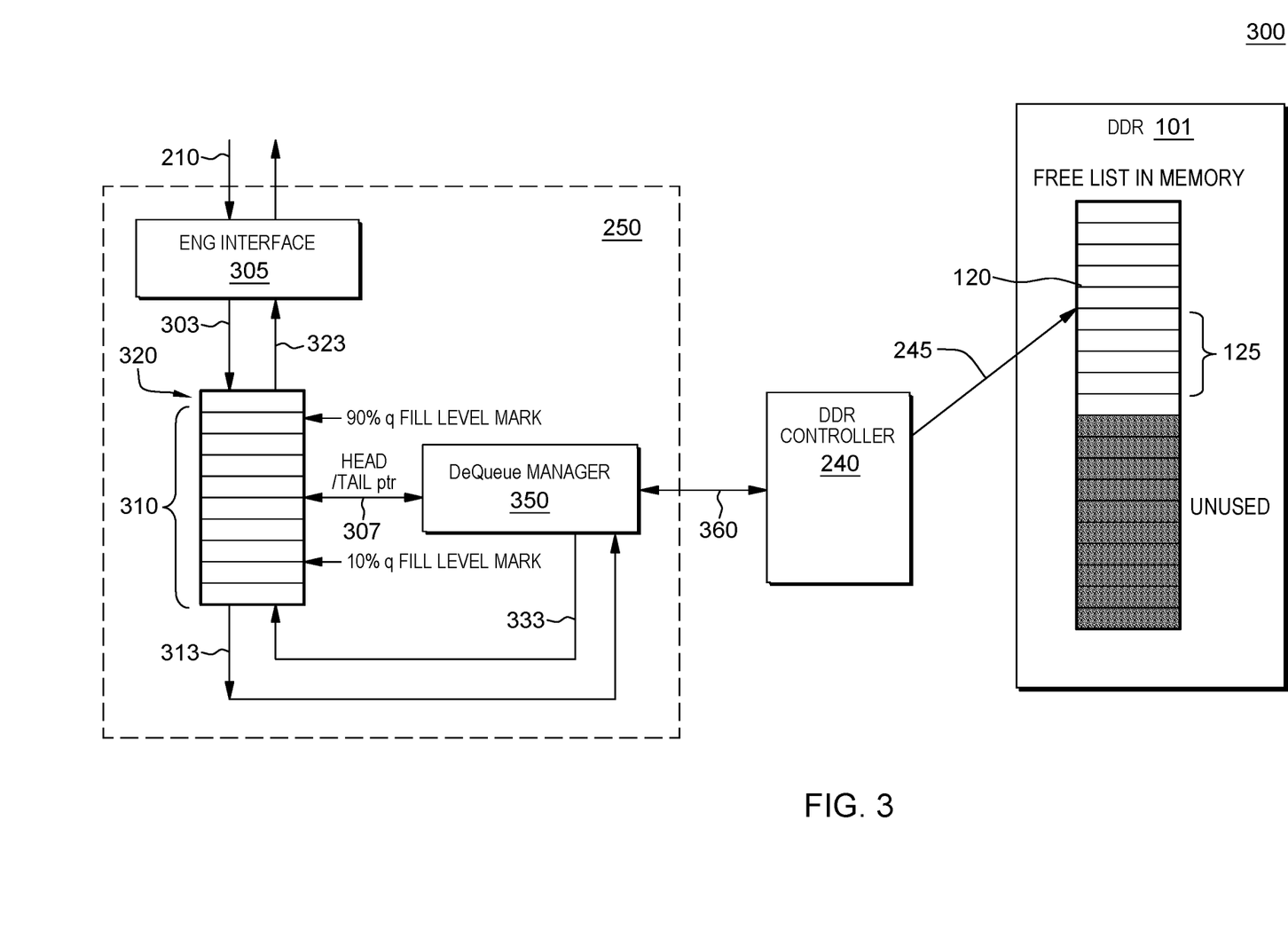
FIG. 3 depicts a circuit including freepointer list manager having a freepointer list cache and a double ended queue manager element running logic for managing queue/de-queue operations of the freepointer list cache in one embodiment.

With reference to FIGS. 2 and 3, there is shown an embodiment of a free memory pointer memory management system 200. The system provides a freepointer list manager 250 including a freepointer list cache embodied as a circular buffer or queue 320 external to the DRAM (e.g., DDR memory 101). In one embodiment, freepointer memory management system is embodied as a Field-programmable Gate Array (FPGA) circuit 300. In other embodiments, the freepointer memory management system may be embodied as an Application Specific Integrated Circuit (ASIC), programmable logic controller, microcontroller or like programmable circuitry. Circular buffer 320 include entries for maintaining a freepointer linked list structure, with each entry pointing to available (free) locations (addresses) in the external or DDR memory 101. The freepointer list manager 250 further includes a controller element 350 for controlling the managing, processing and caching of the linked list of free memory pointers to external memory locations for use by a variety of competing requesting execution units of a processor element 202, e.g., competing requestor 275 of a multi-core processing system.

The system 200 of FIG. 2 shows multiple execution units 275 (e.g., processor cores or "engines") that each may issue request signals 210 requesting either free memory locations from external memory 101, or requesting release of buffered memory locations (pointers) to indicate their new availability in the external memory 101 as free memory.

In one embodiment, the freepointer list manager 250 receives processor engine requests 210 over a bus 215, e.g., a many to one connection such as a multiplexor, and allocates pointers to the requestor engine from the freepointer list cache 320 providing the linked list of available memory locations corresponding to availability of memory locations in the external memory 101. A controller 240 implements processes for updating the freepointer list cache 320 when memory locations become available or freed in the external memory system 101.

By maintaining a small list of freepointers in the circular queue in circuit 300, the latency and excess time incurred in processing a "burst" of requests of freepointers is avoided. The freepointer list manager 250 of FIG. 2 is configured for handling burst traffic, e.g., handling multiple requests in a short time range during which a collection of requests aggregate in nearby processing cycles before the memory could respond. For example, a burst may be requests received in consecutive or near consecutive processing cycles and aggregate before the memory can respond. This may be enabled by the caching of freepointer locations on the requestor (i.e., FPGA or ASIC side) in the freepointer linked list cache structure.

FIG. 3 particularly depicts a more detailed diagram of circuit 300 including freepointer list manager 250 having a freepointer list cache (circular buffer) 320 and a "Double Ended" queue manager element 350 running logic for managing queue/de-queue operations of the freepointer list cache 320 in one embodiment. In one embodiment, the freepointer list cache 320 is configured as a circular queue 310 having entries 315 storing a set or sub-set of implicitly linked free memory locations corresponding to the free point linked list structure 125 in the external (e.g., DDR or DRAM) memory. In one embodiment, the queue 310 may further receive and contain entries of requested locations that have been freed or released by competing requestor engines 275. Each queue memory location pointer entry 315 includes a flag that may be set to another (next) element of the linked list. Being a circular buffer 310, entries may be entered or inserted at both ends of the queue 310, i.e., from the top of the queue and at the tail. The double ended queue manager 350 controls queue operations at both the head and tail (double ended) of the circular buffer.

The double ended queue manager circuit element 350 manages the content of queue 310, and tracks in the queue, using a pointer 307, a first location of the linked list structure of memory locations. Associated with the first location of the linked list memory structure is a flag for linking it to a next element pointing to memory location in the queue.

The double ended queue manager element 350 further directly interfaces with the controller 240 that manages the actual memory read, write and release memory operations via one or more bus or data lines 245. The controller performs operations as known in the art for managing external (e.g., DRAM) memory operations.

In one embodiment, requests 210 (e.g., messages or signals) from a processor engine are received at the freepointer manager via a bus interface element, e.g., a register 305, and processed by the double ended queue manager 350. Request signals received at the bus interface 305 include: 1) requests received indicating memory locations released by the competing requestor engine 275, e.g., a free memory pointer corresponding to a buffered location released by the engine; and 2) requests to receive a new free memory pointer for performing an operation involving the available memory location.

In one embodiment, in response to receipt of such a request indicating a memory location released by the competing requestor engine, and after checking to ensure room available in the queue, the double ended queue manager 350 places the free memory pointer at the head of the queue 310 via data or bus lines 303. Further, any new memory locations retrieved from linked list locations in the DDR 101 are input at the tail of the queue 310. In one embodiment, the double ended queue manager 350 receives incoming linked list of free location pointers from memory controller 240 and places them at the tail of the circular queue 310 via data bus or lines 333.

In response to receipt of a processor engine request to receive a new free memory pointer the double ended queue manager 350 returns the free location requested by the engine. The returned new free memory pointer may be based on a location currently pointed to by head/tail pointer 307 to the queue, or may include an unlinked free memory pointer at the top of the queue. The free memory pointer is provided to the bus interface 305 from the queue 310 via data or bus lines 323 and is transmitted back to the requesting processor core.

The double ended queue manager element 350 further runs logic for handling overflow conditions of queue 310 by initiating a dropping of a linked pointer location(s) from the tail of the queue. In one embodiment, the double ended queue manager receives via bus or data lines 313 the overflow of free locations to be pushed to the free list.

The double ended queue manager element 350 further runs logic for removing entries from the linked list queue from the tail of the queue. When an entry/entries are taken out of this circular queue 310, new entries from the freepointer list 120 of the external memory side may be pulled in via the tail of the queue. The double ended queue manager element logic retains and updates the location of the next head (pointer) in the external memory freepointer list.

In one embodiment, initially, the queue 310 has a linked list is configured from an initial allocation of chunk of memory that has implicit linking, i.e., each pointer of the list includes a pointer linking it to its next entry, e.g., via a next pointer flag. For example, the queue 310 may initially contain a list of pointers to the first sixteen entries in the external memory 101 and these are linked. When the system starts up, it is assumed that these locations are contiguous. But as the list gets consumed or repopulated, the pointers need not be next to each other. The list can be scaled and extended by just adding another chunk of memory and linking the last memory pointer of that chunk to a last entry of the previous block or chunk.

Figure 6:
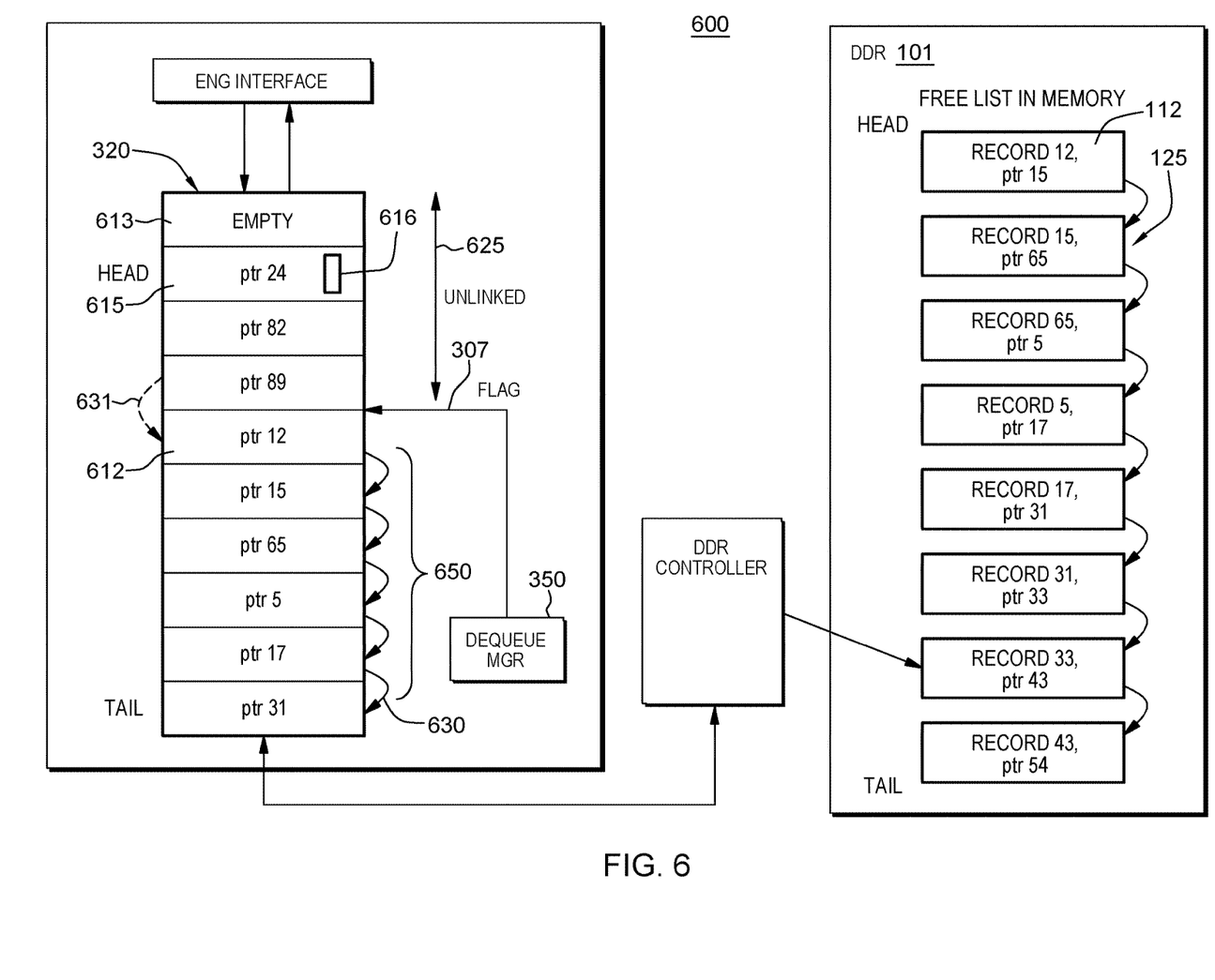
FIG. 6 shows an example linked list of free memory pointers in the circular buffer and corresponding to free list entries in the external memory system.

FIG. 6 shows an example linked list 650 of free memory pointers in the circular buffer 320 and corresponding to free linked list entries 120 in the external memory system 101. As shown in FIG. 6, the double ended queue manager maintains queue linked list 650 and supports push, pop, drop, read/write memory operations. A top (head) entry 612 of the linked list 650 queue currently pointed to by head/tail pointer flag 307 corresponds to the head entry 112 of the linked list 120 at the external memory. Linked list entries 615 are linked by pointer 630 linking an entry to the next freepointer entry.

As memory gets used and released, the list 650 will become a non-contiguous linked list of elements. When local FIFO operations evicts pointers—the double ended queue manager 350 checks if a pointer 631 needs to be linked to the last known head pointed to by pointer 307. The manager 350 sets the head/tail pointer flag 307 in the queue linked list to point to the head of the linked list and determine which queue portion include unlinked memory pointers 625. Unlinked memory pointers include free memory pointers 615 corresponding to most recently memory locations that have been released by engines have been received and placed at the top of the queue 310.

In one embodiment, every entry in the circular buffer 620 includes a flag 616 that indicates if it was pushed from top (e.g., pointers released after use) or if it was inserted from bottom (e.g., new pointers retrieved from DRAM). A first entry 613 of the circular buffer may be maintained as empty to facilitate quick entrance and egress of free memory pointers to/from the buffer. As part of queue management, the double ended queue manager logic further detects a queue condition and determines whether to just drop the bottom entry pointer or push it back into the external memory, e.g., when a queue overflow condition is detected. Alternatively, or in addition, the last unlinked entry can be tracked.

Figure 4A:
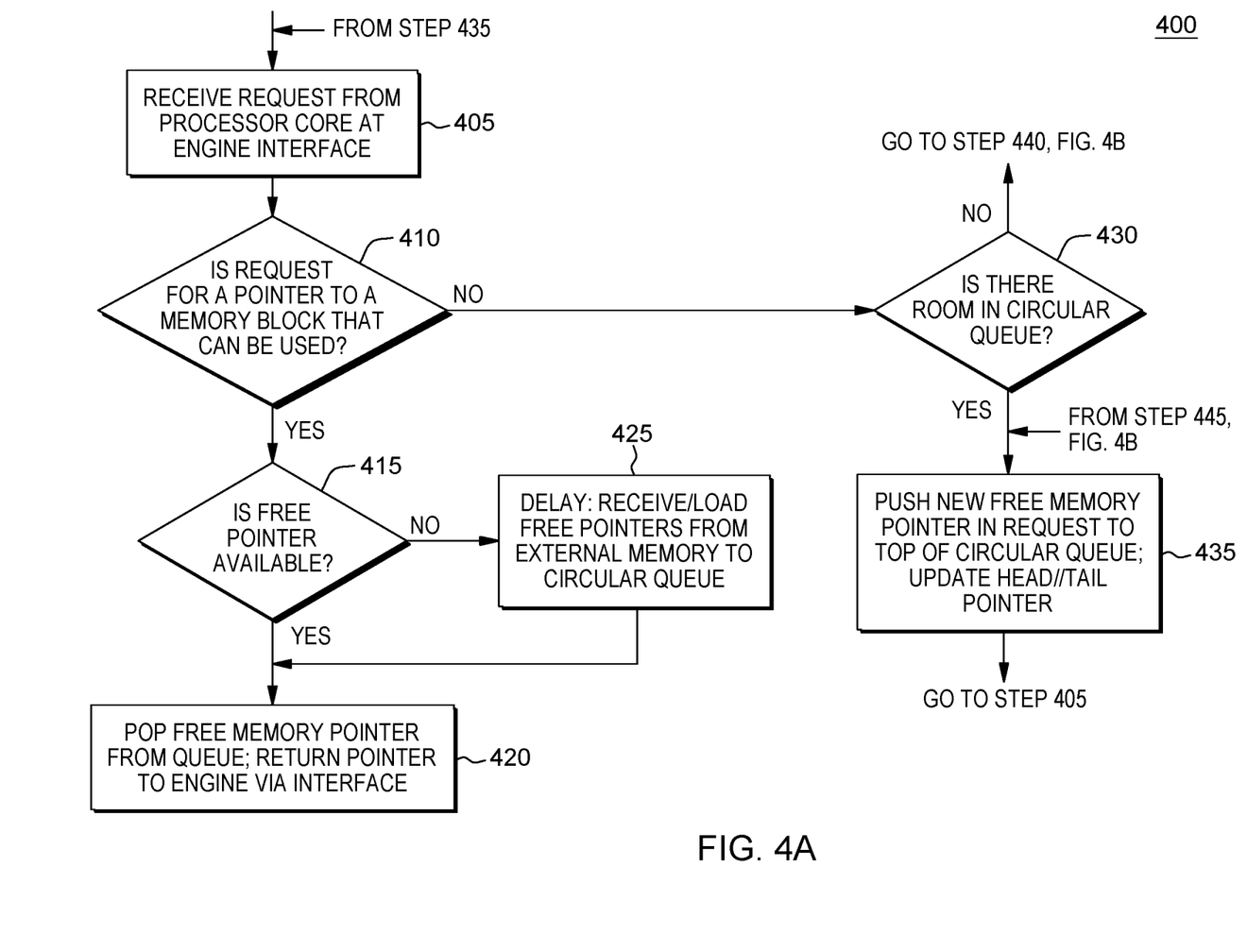
FIGS. 4A-4B depicts a buffer freepointer queue management logic and methods run by the double ended queue manager element according to an embodiment.
Figure 4B:
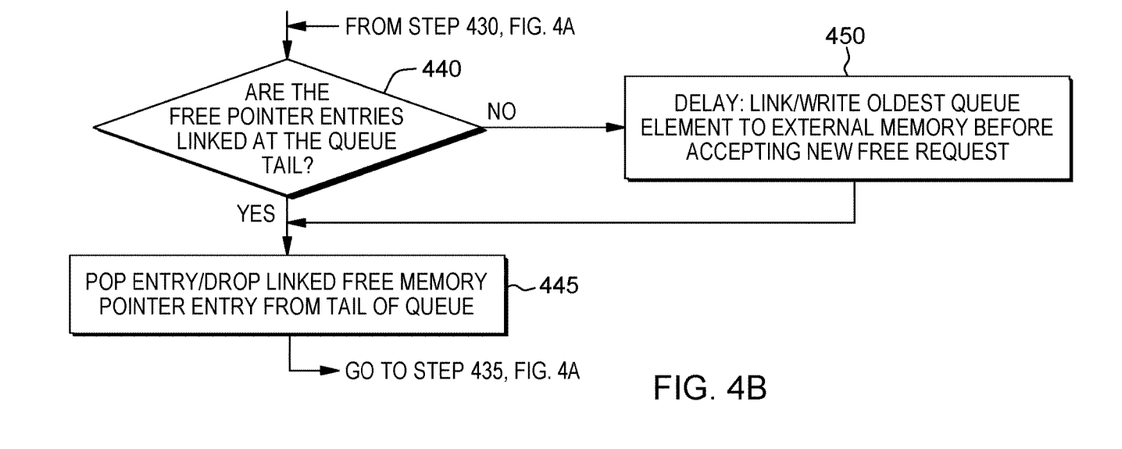

FIGS. 4A-4B depicts an embodiment of the circular buffer freepointer queue management method 400 run by the DeQueue manager circuit 350.

The method 400 of operating the circular buffer 320 includes at 405 responding to requests 210 received via the engine interface which requests may include: 1) a request to receive free memory pointers for accessing the corresponding free memory available in external memory, or 2) a request from a processor core or engine that has released a memory location and thus return free memory pointers that point to the released free memory locations back to the memory. At 410, a determination is made as to whether the received request from a core or engine is a request for a pointer to a memory block in the external memory that can be used. For example, a request for a free location may be sought for creating a tuple record. If at 410, it is determined that the received request from a core or engine is a request to receive a pointer to a new memory space, then at 415 a determination is made as to whether a freepointer is available in the queue 310. If there are free memory pointers available in the queue, the address of the first location in the linked list is returned to requestor. That is, at 420, the double ended queue manager 350 pops a free memory pointer from the top of the queue and returns the free memory pointer back to the requesting engine via the engine interface 305. However, if at 415, the double ended queue manager determines that there are no free memory pointers available in the queue, then the process proceeds to 425 where a delay may incur until there can be received freepointers pushed from the external memory and loaded at the tail of queue 310. Once freepointers are received will the method return to 420, so the double ended queue manager 350 may pop a free memory pointer from the top of the queue.

Returning to 410, FIG. 4A, if it is determined that the received request from a processor core or engine is a request to return a free memory pointer pointing to a buffered memory location released by that core or engine, then the process proceeds at 430 to determine whether there is any room in queue 310 to receive the released free memory pointer. If there is room in the queue 310, then at 435, the double ended queue manager 350 pushes the new free memory pointer in the received request to the head of the queue 310.

Further, at 435, when the record is freed, the address of this memory location is pushed back into the circular buffer via the top. The head/tail pointer 307 (e.g., a rd_ptr) is updated, e.g., decremented to reflect the freepointer addition at the top of the queue.

In one embodiment, at 435, the memory list does not yet know of this new insertion of a freed location at the top of the circular buffer. Thus, if the inserted freepointer in circular buffer is used immediately, there is no update that needs to be sent to the external memory freepointer list as it has been provided to a requesting processor engine. The updating refers to the updating the next pointer in the location in external memory to point to the current head of the linked list. As the double ended queue manager 350 performs processes external to the controller and the external memory and thus increase throughput and decrease latency when processing multiple processor core or engine requests that arrive at the engine interface for processing at or near the same time as a burst of requests. Otherwise, when a lot of freepointer entries are released and inserted to the circular buffer, there would be a need to update the freepointer list in the external memory via the controller.

From step 435, the process then returns to step 405 where the double ended queue manager waits for the next received request.

Otherwise, returning to 430, FIG. 4A, if it is determined that there is no room in the queue 310 for receiving the free memory pointer from the processor engine corresponding to the released memory location, then the process proceeds to step 440, FIG. 4B, where a determination is made whether the freepointer entries at the queue tail are linked. If at 440, it is determined that the freepointer entries at the queue tail are linked, the process proceeds to 445 where the double ended queue manager controls popping/dropping of a linked free memory pointer entry from the tail of queue. This is to make room for the released freepointer entries which may be pushed on to the top of the queue. Then the process proceeds back to step 435, FIG. 4A in order to push the new free memory pointer in request to the top of circular queue and update the head/tail pointer.

Otherwise, if at 440, FIG. 4B it is determined that the freepointer entries at the queue tail are not linked, the process proceeds to 450 where the double ended queue manager controls an operation to first link/write oldest queue element to the external memory which may incur a processing delay before accepting the newly freed request. Once the oldest queue element is written into the external memory the process proceeds to step 445 where that oldest queue element having the linked free memory pointer entry is popped from the tail of queue. Then the process proceeds back to step 435, FIG. 4A in order to push the new free memory pointer in request to the top of circular queue and update the head/tail pointer. The processes of FIGS. 4A and 4B continually repeat.

In one embodiment, background processes are run by the double ended queue manager 350 to monitor queue occupancy and implementing logic to determine when a queue entry/entries is/are to be taken out of the circular buffer, and whether new entries from the external memory side may be pulled out and placed in the circular buffer queue. The double ended queue manager 350 knows the location of the next head in the external memory freepointer list.

Figure 5:
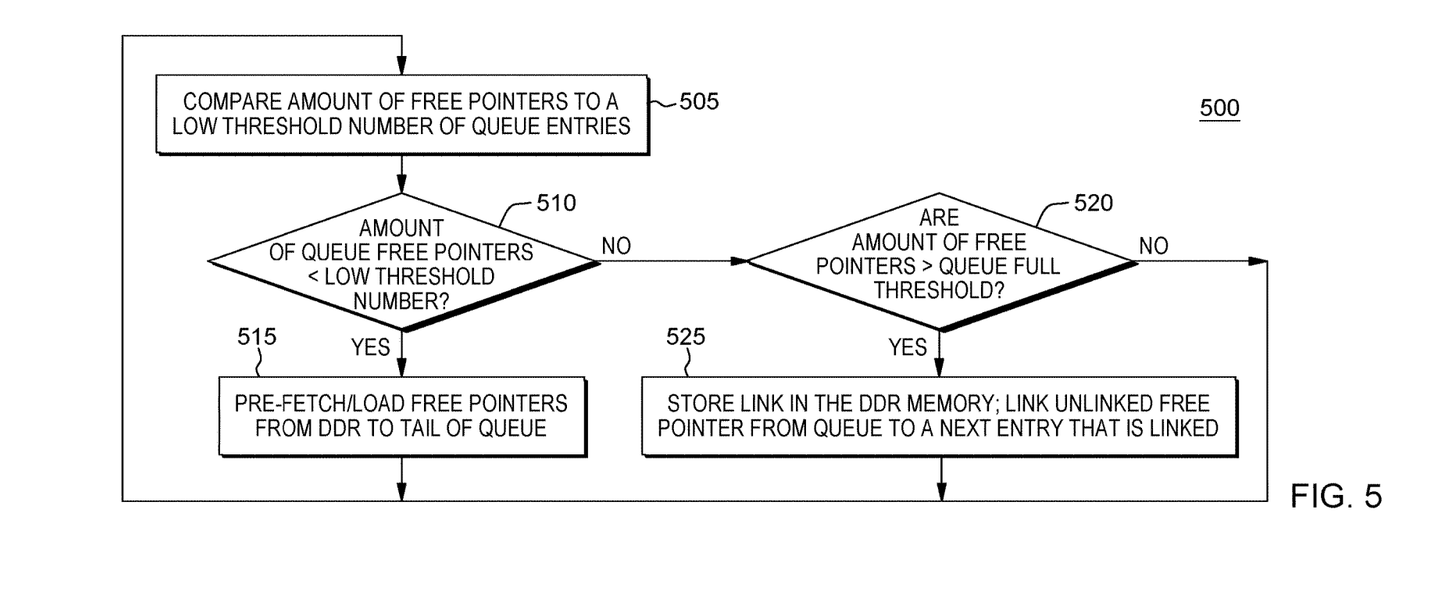
FIG. 5 depicts a queue management method run by the double ended queue manager as background processes in one embodiment.

FIG. 5 depicts a queue management method run by the DeQueue manager as background processes 500 for managing the linked list stored of freepointers stored at the queue 310 in one embodiment. At step 505, FIG. 5, the process first compares the amount of freepointers against a low threshold number of queue entries having freepointers, i.e., queue occupancy. In one non-limiting example, this lower threshold freepointer occupancy level may be 10% of the total number of circular buffer entries.

Proceeding to 510, if it is determined that the amount of queue entries having freepointers is less than or drops below the lower threshold occupancy level, then at 515, FIG. 5 the double ended queue manager will pre-fetch freepointers from the external memory and receive new free memory pointers via the controller 240 and load (add) them to the tail of queue.

Otherwise, 510, if it is determined that the amount of queue entries having freepointers is above or exceeds the lower threshold, then the process proceeds to 520, where a further determination is made as to whether the amount of queue entries having freepointers is greater than a queue full threshold or upper queue occupancy threshold. In one non-limiting example, this upper threshold freepointer occupancy level may be 90% of the total number of circular buffer entries.

If it is determined at 520 that the amount of queue entries having freepointers has not exceeded the upper queue occupancy threshold, then the process ends and returns to step 505 for the continued monitoring of queue occupancy.

Otherwise, if it is determined at 520 that the amount of queue entries having freepointers is above or exceeds the upper queue occupancy threshold, then the process proceeds to 525, where the double ended queue manager 350 causes links on the queue to be stored in the external memory. In one embodiment, if pointers on the queue are unlinked, then the freepointer is linked to a next entry that is linked and the process will return back to step 505. That is, the double ended queue manager keeps track of a first of unused pointers, for which next pointer is implicitly the incremented address.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. A free memory pointer management apparatus for a memory system, said free memory pointer management apparatus comprising:
   a circular queue located external to the memory system, the circular queue having entries for storing pointers to free memory locations in the memory system, said circular queue including further entries pointing to corresponding entries in a linked list structure of free memory pointers corresponding to available memory locations in the memory system, the linked list structure located in the memory system;
   a queue controller to receive requests from one or more processor cores of a multi-core processor, a request comprising one of: a request to receive a free memory location, or a request to release a freed memory location; and
   said queue controller removing of a stored memory pointer via a top entry of said circular queue for transmittal to a requesting processor core in response to said request to receive, or adding a memory pointer released from the processor core to the top entry of said circular queue in response to said request to release, said free memory pointer management apparatus managing a sub-set of free memory pointers to the memory system.

2. The free memory pointer management apparatus according to claim 1, said queue controller is configured to:
   track a first free memory location pointer corresponding to a current head of said linked list structure; and
   set a queue pointer for pointing to a circular queue entry corresponding to the current head of the linked list structure of free memory pointers, said queue controller configured to decrement said queue pointer in response to adding a memory pointer of a released freed memory location via the top entry of said circular queue.

3. The free memory pointer management apparatus according to claim 2, wherein said queue controller is further configured to:
   monitor a freepointer occupancy level of said circular queue, and responsive to said circular queue occupancy at or above a determined upper threshold level, said controller configured to:
   determine whether one or more pointer entries at and above the tail entry of the circular queue are included in said linked list structure of free memory pointers; and
   if said one or more pointer entries at and above the tail entry of the circular queue are linked, then dropping one or more linked freepointer memory entries from said tail entry of said circular queue.

4. The free memory pointer management apparatus according to claim 2, wherein an initial allocation of free memory pointers in said circular queue comprises: a contiguous block of memory with each corresponding free memory pointer linked to a next free memory pointer in said circular queue.

5. The free memory pointer management apparatus according to claim 3, wherein if it is determined that the one or more pointer entries at and above the tail entry of the circular queue are not linked to said linked list structure, then said queue controller is further configured to:
   push said new freed location pointer received from a core to new available memory location directly to said memory system via said memory controller.

6. The free memory pointer management apparatus according to claim 3, wherein said queue controller is further configured to:
   determine whether circular queue freepointer entries are not linked to said linked list structure of free memory pointers; and
   setting a next queue pointer in a queued freepointer entry that is not linked to link it to said linked list structure of freepointer memory locations at an entry currently at the head of said linked list structure.

7. The free memory pointer management apparatus according to claim 1, wherein said queue controller is further configured to:
   monitor a freepointer occupancy level of said circular queue; and
   in response to falling below a pre-determined lower threshold circular queue occupancy level, pre-fetch pointers to new available memory locations directly from said memory system and placing said received new free memory pointers to said circular queue via a tail entry of said circular queue.

8. The free memory pointer management apparatus according to claim 7, wherein said memory system comprises a memory controller for controlling entries of a freepointer linked list structure in said memory system, wherein to pre-fetch said pointers, said queue controller is configured to:
   receive from said memory controller said pointers corresponding to new available memory from the memory system.

9. The free memory pointer management apparatus according to claim 1, embodied as a field-programmable gate array (FPGA) circuit, or an Application Specific Integrated Circuit.

10. A multiprocessor computing system comprising one or more processor devices and a shared memory system comprising one or more memory storage structures having addressable locations for storing data for said one or more processor devices, said memory system comprising a freepointer linked list structure of pointers pointing to said addressable memory locations, and a memory controller for controlling entries of the freepointer linked list structure in said memory system, said system comprising:
   a circular queue located external to said memory system, said circular queue having entries for storing pointers to free memory locations in the memory system, and having further entries pointing to corresponding entries in the freepointer linked list structure of free memory pointers corresponding to available memory locations in said memory system;
   a queue controller coupled to said circular buffer, said queue controller configured to receive requests from one or more processor devices, a request comprising one of: a request to receive a free memory location, or a request to release a freed memory location; and
   said queue controller removing a stored memory pointer via a top entry of said circular queue for transmittal to a requesting processor device in response to said request to receive, or adding a memory pointer released from the processor device to the top entry of said circular queue in response to said request to release, said circular queue and queue controller managing a sub-set of free memory pointers to said memory system.

11. The multiprocessor computing system according to claim 10, wherein said queue controller is further configured to:

track a first free memory location pointer corresponding to a current head of said linked list structure; and set a queue pointer for pointing to a circular queue entry corresponding to the current head of the linked list structure of free memory pointers, said queue controller configured to decrement said queue pointer in response to adding a memory pointer of a released free location via the top entry of said circular queue.

12. The multiprocessor computing system according to claim 11, wherein said queue controller is further configured to:

monitor a freepointer occupancy level of said circular queue, and responsive to said circular queue occupancy at or above a determined upper threshold level, said controller configured to:

determine whether one or more pointer entries at and above the tail entry of the queue are included in said linked list structure of free memory pointers; and if said one or more pointer entries at and above the tail entry of the circular queue are linked, then dropping one or more linked freepointer memory entries from said tail of said circular queue; and if it is determined that the one or more pointer entries at and above the tail entry of the circular queue are not linked to said linked list structure, then said queue controller is further configured to:

push said new freed location pointer received from a processor device to a new available memory location directly to said memory system via said memory controller.

13. The multiprocessor computing system according to claim 10, wherein said queue controller is further configured to:

monitor a freepointer occupancy level of said circular queue; and in response to falling below a pre-determined lower threshold circular queue occupancy level, pre-fetch pointers to new available memory locations directly from said memory system and placing said received new free memory pointers to said circular queue via a tail entry of said circular queue, wherein to pre-fetch said pointers, said queue controller is further configured to: receive from said memory controller said pointers to new available memory from the memory system.

14. A method of queuing free memory locations pointing to buffers of same data types, the method comprising:

storing, in a memory, a linked list structure of free memory locations in the memory;

storing, in a circular queue external to the memory, one or more entries corresponding to a set of implicitly linked free memory locations, and one or more further entries of said circular queue comprising a pointer to memory location that has been freed by a requesting consumer, and includes an entry corresponding to the top of the linked list structure;

tracking, using a queue controller, the first location of the linked list structure which is linked;

inserting, by the queue controller, a pointer to a free memory location in the circular queue at either end of the circular queue, wherein the released freed memory locations are inserted at the head entry of the queue, and wherein new locations retrieved from linked list structure locations at inserted at the tail entry of the queue; and detecting, by the queue controller, an occupancy level of said circular queue, and in response to a detected occupancy level, one of: dropping locations from the tail entry of the circular queue, or otherwise updating by pre-fetching said new locations from said the linked list structure.

15. The method of claim 14, wherein said detecting an occupancy level comprises:

comparing, by the queue controller, the circular queue occupancy level against a predetermined lower threshold, said prefetch updating of said new locations from the linked list structure occurring in response to a queue occupancy below said predetermined lower threshold.

16. The method of claim 14, wherein said detecting comprises:

comparing, by the queue controller, the circular queue occupancy level against a predetermined upper threshold, and in response to determining the circular queue occupancy level is above said predetermined upper threshold, determining, by said queue controller, whether the pointer entries at the tail of the circular queue are linked to said linked list structure in said memory structure.

17. The method of claim 16, wherein in response to determining that the pointer entries at the tail of the circular queue are linked to said linked list structure, then:

performing said dropping of freed memory location pointers from the tail entry of the circular queue.

18. The method of claim 16, wherein in response to determining that the pointer entries at the tail of the circular queue are not linked to said linked list structure, then:

pushing, by said queue controller, said freed memory location pointers to new available memory location directly to said memory system via said memory controller.

19. The method of claim 14, further comprising:

initially allocating to said circular queue entries free pointers to a contiguous block of said memory, wherein each pointer of said circular queue entry implicitly linked to a pointer of the next entry in the circular queue.

20. The method of claim 19, further comprising:

tracking, by said queue controller, an initially allocated pointer entry corresponding to a first memory block of said contiguous block of memory.

* * * * *